United States Patent [19]

Idel et al.

[11] Patent Number: 4,537,951

[45] Date of Patent: Aug. 27, 1985

[54] PROCESS FOR THE PRODUCTION OF OPTIONALLY BRANCHED POLYARYLENE SULFIDES

[75] Inventors: Karsten Idel, Krefeld; Edgar Ostlinning, Duesseldorf; Wolfgang Koch, Bischoffen; Ludwig Bottenbruch, Krefeld; Walter Heitz, Kirchhain, all of Fed. Rep. of Germany

[73] Assignee: Bayer Aktiengesellschaft, Leverkusen, Fed. Rep. of Germany

[21] Appl. No.: 592,698

[22] Filed: Mar. 23, 1984

[30] Foreign Application Priority Data

Apr. 5, 1983 [DE] Fed. Rep. of Germany ....... 3312284

[51] Int. Cl.$^3$ .............................................. C08G 75/14
[52] U.S. Cl. ..................................... 528/388; 524/701; 524/714; 524/773
[58] Field of Search ................ 528/388; 524/714, 701, 524/773

[56] References Cited

U.S. PATENT DOCUMENTS

| 4,038,262 | 7/1977 | Edmonds, Jr. | 528/388 |
| 4,373,090 | 2/1983 | Edmonds, Jr. | 528/388 |
| 4,393,197 | 7/1983 | Edmonds, Jr. | 528/388 |

*Primary Examiner*—Melvyn I. Marquis
*Attorney, Agent, or Firm*—Connolly and Hutz

[57] ABSTRACT

The invention relates to a process for the production of optionally branched polyarylene sulfides by reacting dihalogen benzenes in admixture with aromatic polyhalogen compounds and alkali sulfides in polar solvents, the reaction being carried out in the presence of reducing agents.

9 Claims, No Drawings

PROCESS FOR THE PRODUCTION OF OPTIONALLY BRANCHED POLYARYLENE SULFIDES

This invention relates to a new process for the production of optionally branched polyarylene sulfides from optionally substituted halogen benzenes in admixture with aromatic polyhalogen compounds and alkali sulfides in polar solvents in the presence of reducing agents.

Polyarylene sulfides are known (cf. U.S. Pat. Nos. 2,538,941 and 2,513,188). They may be produced from the corresponding aromatic halogen compounds and alkali or alkaline earth sulfides. Thus, in the process described in U.S. Pat. No. 3,354,129 for example, monomeric and polymeric sulfides are produced by reacting at least one cyclic compound which contains a double bond between adjacent ring atoms and which is substituted by at least one halogen atom with an alkali sulfide in a polar solvent. Polyhalogen compounds may be used as the branching agents.

DE-AS No. 24 53 749 describes the use of carboxylates as reaction accelerators and the additional use of thio compounds as sulfur donors. DE-OS No. 26 23 363 and U.S. Pat. No. 4,038,261 describe the use of lithium chloride or lithium carboxylates as catalysts for the production of arylene sulfide polymers.

According to U.S. Pat. No. 4,038,249, alkali carbonates in combination with alkali carboxylates and, according to U.S. Pat. No. 4,038,263, lithium halides are used as catalysts for the production of polyphenylene sulfides. According to DE-OS No. 26 23 362 and U.S. Pat. No. 4,038,262, lithium halides or alkali carboxylates are used together with carbon dioxide as catalysts in the production of arylene sulfide polymers.

In addition, U.S. Pat. No. 4,038,260 for example describes the use of alkali metal sulfonates and U.S. Pat. No. 4,039,518 the use of lithium carbonate and lithium borate as catalysts.

According to U.S. Pat. No. 4,096,132, unbranched p-polyphenylene sulfides having a slightly elevated melt viscosity are obtained by carrying out the reaction in the presence of alkali carboxylate, preferably lithium acetate, and alkali hydroxides.

Polyarylene sulfides having a reduced melt flow index may be obtained using trialkali phosphate catalysts (DE-OS No. 29 30 710) or alkali phosphonate catalysts (DE-PS No. 2,930,797).

According to DE-OS No. 26 23 333, the water of hydration of the lithium acetate used as catalyst is removed in a first step and the water of hydration of the sodium sulfide hydrate in a second step.

In general, the p-polyphenylene sulfides are subjected to a hardening or curing step by a chain-extending or branching reaction (cf for example U.S. Pat. Nos. 3,727,620; 3,524,835 and 3,839,301). Without this hardening step, the p-polyphenylene sulfides generally have a low melt viscosity which precludes thermoplastic processing.

According to U.S. Pat. No. 3,919,177, it is possible by using lithium carboxylates as catalysts for the p-polyphenylene sulfide produced to be melt-spun into fibers without preliminary hardening. According to U.S. Pat. No. 4,116,947 and DE-OS No. 28 17 731, the effect of a certain residual quantity of water is that the p-polyphenylene sulfides can be spun into fibers and extruded and also molded without any need for hardening.

The present invention is based on the realization that branched polyarylene sulfides having a high melt viscosity and a high molecular weight can be obtained by condensing di- and polyhalogen benzenes and alkali sulfides in known manner in certain polar solvents and carrying out the reaction in the additional presence of from 0.02 to 0.8 mole percent (per mole of alkali sulfide) of a reducing agent.

The polyarylene sulfides obtained may be molded, extruded and spun into fibers without any need for a hardening aftertreatment. Compared with commercially available polyarylene sulfides, they show considerably improved mechanical properties.

The present invention relates to a process for the production of optionally branched, high molecular weight polyarylene sulfides having a high melt viscosity, characterized in that (a) dihalogen benzenes of which from 0 to 100 mole percent and preferably from 50 to 100 mole percent correspond to the following formula

and from 0 to 100 mole percent and preferably from 0 to 50 mole percent to the following formula

where the sum of (I) and (II) is 100 mole percent and in which formulae the symbols X represent chlorine or bromine in the meta- or para-position to one another and $R^1$ may be the same or different and represent hydrogen, $C_1$–$C_{20}$-alkyl, $C_5$–$C_{20}$-cycloalkyl, $C_6$–$C_{24}$-aryl, $C_7$–$C_{24}$-alkaryl or $C_7$–$C_{24}$-aralkyl; two radicals $R^1$ in the ortho position to one another may be attached to form an aromatic or heterocyclic 6-membered ring which may contain up to 3 heteroatoms, such as O, N, S, and one radical $R^1$ is always different from hydrogen, and (b) from 0 to 3.0 mole percent and preferably from 0.4 to 2.0 mole percent, based on the sum of the aromatic dihalogen compounds corresponding to formulae (I) and (II), of an aromatic tri- and tetra-halogen compound corresponding to the following formula $$ArX_n \qquad (III)$$

in which

Ar is an aromatic or heterocyclic $C_6$–$C_{24}$ radical which may contain up to 3 heteroatoms, such as N,O,S, X represents chlorine or bromine and n=3 or 4, (c) alkali sulfides, preferably sodium or potassium sulfide or a mixture thereof, preferably in the form of their hydrates or aqueous mixtures, optionally in conjunction with alkali hydroxides, such as sodium and potassium hydroxide, the molar ratio of (a+b):c amounting to between 0.85:1 and 1.15:1 and preferably to between 0.95:1 and 1.05:1, are reacted (d) in a polar solvent, optionally in the presence of other cosolvents and optionally in the presence of catalysts, the molar ratio of (c) to (d) amounting to between 1:2 and 1:15, the reaction being carried out in the additional presence of reducing agents.

The usual substances in the usual quantities may be used as catalysts for this purpose, examples of such substances including alkali fluorides, alkali phosphates and alkali carboxylates. From 0.2 to 1 mole of catalyst may be used per mole of alkali sulfide.

Examples of aromatic dihalogen compounds corresponding to formula (I) which may be used in accordance with the invention include m-dichlorobenzene, p-dichlorobenzene, p-dibromobenzene, m-dibromobenzene, 1-chloro-4-bromobenzene. They may be used either individually or in admixture with one another.

Examples of aromatic dihalogen compounds corresponding to formula (II) which may be used in accordance with the invention are 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene. They may be used either individually or in admixture with one another.

Examples of aromatic tri- and tetrahalogen compounds corresponding to formula (III) which may be used in accordance with the invention include 1,2,3-trichlorobenzene, 1,2,4-trichlorobenzene, 1,2,4-tribromobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,4,6-trichlorotoluene, 1,2,3,4-tetrachloronaphthalene, 1,2,4,5-tetrachlorobenzene, 2,2',4,4'-tetrachlorobiphenyl, 1,3,5-trichlorotriazine.

If aromatic tri- and/or tetrahalogen compounds corresponding to formula (III) are used, branched polyarylene sulfides are obtained.

The alkali sulfides, preferably potassium and sodium sulfide, are preferably used in the form of their hydrates or aqueous mixtures. In addition, they may be directly produced in the reaction solution from hydrogen sulfide and corresponding alkali hydroxides or from alkali hydrogen sulfides and corresponding alkali hydroxides. Mixtures of the alkali sulfides may be used.

Depending on the quantity of alkali hydrogen sulfide in the reaction solution, which may either be present as an impurity in the alkali sulfide or may be formed during the reaction, alkali hydroxide is additionally introduced in a stoichiometric quantity to regenerate the alkali sulfide. Instead of adding alkali hydroxide, it is also possible to add compounds of the type which split off or form alkali hydroxides under the reaction conditions.

The alkali hydroxides used may be, for example, lithium hydroxide, sodium hydroxide and potassium hydroxide and also mixtures thereof, sodium hydroxide being preferred. In general, the reaction may be carried out in any polar solvent which guarantees adequate solubility of the organic and inorganic reactants under the reaction conditions. Preferred polar solvents are amides, lactams and ureas, particularly preferred solvents being N-alkylated amides, lactams and cyclic ureas.

Lactams which may be used in the process according to the invention are lactams of $C_3$–$C_5$ aminoacids optionally substituted on the carbon skeleton by substituents that are inert under the reaction conditions, for example by an alkyl radical containing from 1 to 5 carbon atoms.

N-alkyl lactams suitable for use in the process according to the invention correspond to the lactams according to the invention, but additionally contain a $C_1$–$C_6$-alkyl radical on the nitrogen atom.

Tetraalkylated ureas suitable for use in the process according to the invention correspond to the following formula

in which the symbols $R^2$ may be the same or different and represent a $C_1$–$C_4$-alkyl radical, and also include cyclic ureas corresponding to the following formula

in which the symbols $R^2$ are as defined above and preferably represent methyl and $R^3$ is an optionally substituted ethylene or propylene radical.

The following are examples of suitable solvents: N,N-dimethyl formamide, N,N-dimethylacetamide, N,N-diethylacetamide, N,N-dipropylacetamide, N,N-dimethylbenzoic acid amide, caprolactam, N-methyl caprolactam, N-ethyl caprolactam, N-isopropyl caprolactam, N-isobutyl caprolactam, N-propyl caprolactam, N-butyl caprolactam, N-cyclohexyl caprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-isobutyl-2-piperidone, N-methyl-6-methyl-2-piperidone, N-methyl-3-ethyl-2-piperidone, N-methyl-2-oxo-hexamethylene imine, N-ethyl-2-oxo-hexamethylene imine, tetramethyl urea, 1,3-dimethyl ethylene urea, 1,3-dimethyl propylene urea.

Mixtures of the above-mentioned solvents may be used.

According to the invention, hydrazines, borohydrides and alkali formates are used as the reducing agents.

The hydrazines correspond to the following formula

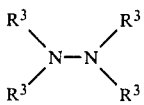

(VI)

in which the symbols $R^3$ may be same or different and represent hydrogen or a $C_1$–$C_4$-alkyl radical, preferably hydrogen.

Hydrazine is used in the form of its hydrate, although it may also be used in the form of a concentrated aqueous solution.

The borohydrides used are alkali borohydride, such as lithium, sodium or potassium borohydride, preferably sodium borohydride ($NaBH_4$).

The alkali formates used are lithium, sodium or potassium formate, preferably sodium formate (HCOONa).

The condensation temperature is generally in the range from 160° to 300° C. and preferably in the range from 200° to 285° C. The reaction time may be up to 10 hours, but is preferably between 0.2 and 8 hours. It may be of advantage to increase the reaction temperature in stages over that period.

The dihalogen benzene and alkali sulfide are used in substantially equimolar quantities. The molar ratio of dihalogen benzene to alkali sulfide is in the range from 0.85:1 to 1.15:1 and preferably in the range from 0.95:1 to 1:05:1.

The aromatic tri- or tetrahalogen compounds of formula (III) according to the invention are added in a quantity of up to several mole percent, based on the dihalogen benzenes, either together with or separately from the dihalogen benzenes. In general, they are used in a quantity of from 0.2 to 3.0 mole percent and preferably in a quantity of from 0.4 to 2.0 mole percent, based on the quantity of dihalogen benzene.

The solvents may be used in quantities variable over a wide range, but are generally used in a quantity of from 2 to 15 moles per mole of alkali sulfide.

Up to 80 mole percent of reducing agent may be used per mole of alkali sulfide. The reducing agent is preferably used in a quantity of from 2 to 50 mole percent and, more preferably, in a quantity of from 2.5 to 25 mole percent per mole of alkali sulfide.

The process according to the invention may be carried out as follows:

The alkali sulfides may be freed from water in one or more steps, for example by distilling off the water from the reaction solution. The partial removal of water is advantageously carried out before addition of the dihalogen compounds corresponding to formulae (I) and (II). The alkali sulfide and the reducing agent may be partly freed from water separately.

In principle, the reactants may be combined in any form. The aromatic dihalogen compounds corresponding to formulae (I) and (II) and the aromatic polyhalogen compounds corresponding to formula (III) may be added together or separately, continuously in portions or directly all at once to the alkali sulfide, the solvent or part thereof and to the reducing agents and, optionally, to the catalyst.

However, the alkali sulfide may be added together with the solvent or a part thereof and the reducing agents to the compound corresponding to formulae (I) and (II) and the aromatic polyhalogen compounds (III). It is even possible directly to combine all the reactants. Any other combination of the reactants is also possible.

The removal of water before addition of the reducing agent can be of advantage in special cases, for example where alkali borohydrides are used.

The reaction mixture may be worked up in several ways:

The polyarylene sulfide may be separated off from the reaction solution either directly or after the addition of, for example, water and/or dilute acids by standard methods, for example by filtration or centrifuging.

The filtration step is generally followed by washing with water to remove any inorganic constituents which may be adhering to the polymers, for example residues of alkali sulfides and alkali chlorides. Washing or extraction with other washing liquids, which may even be carried out in addition to or after this washing step, is also possible. The polymer may be recovered by distilling off the solvent from the reaction vessel, followed by washing, as described above.

The polyarylene sulfides according to the invention may be mixed with other polymers, with pigments and fillers, for example graphite, metal powder, glass powder, quartz powder or glass fibers, or with the additives normally used for polyarylene sulfides, for example the usual stabilizers or mold-release agents.

In general, the melt flow index of polyarylene sulfides is measured in accordance with ASTM 1238-70 at 316° C. using a 5 kg weight and is expressed in g/10 mins.

With high melt flow values, however, measurement by this method can involve difficulties on account of the high outflow rate of the polymer melt.

Accordingly, the melt viscosity $\eta m$ of the polymer melt (in Pa.s) was determined as 306° C. in dependence upon the shearing force $\tau$ (in Pa) using an Instron rotational viscosimeter (Instron rheometer).

In this way, it is possible to determine the melt viscosity over a very wide range of from $10^{-1}$ $10^7$ Pa.s. In the Instron rheometer, the polymer is melted between a fixed plate and a rotatable cone and the torque of the cone is determined. The melt viscosity can be calculated as a function of the shearing force from the torque, the angular speed and the apparatus data. An Instron model 3250 rheometer was used (diameter of the cone and the plate 2 cm).

The value quoted in the melt viscosity which is measured under a shearing force $\tau$ of $10^2$ Pa.

After isolation from the reaction mixture, the polyarylene sulfides according to the invention generally have melt viscosities of from $0.5 \times 10^3$ to $5 \times 10^6$ Pa.s and preferably from $1.5 \times 10^3$ to $10^4$ Pa.s. They may be directly processed by extrusion, extrusion blowing, injection molding or other standard processes to form films, moldings or fibers which are used for the usual applications, for example as automobile parts, accessories, electrical components, for example switches, circuit boards, chemical-resistant parts and machines, such as pump housings and pump flywheels, etching bath trays, sealing rings, parts of office machines and communications equipment and also domestic appliances, valves, ball-bearing components, etc.

EXAMPLES

COMPARISON EXAMPLE 1

This Example describes by way of comparison the production of p-polyphenylene sulfide in accordance with U.S. Pat. No. 3,354,129.

129 g of sodium sulfide trihydrate (corresponding to 1 mole of $Na_2S$) and 300 g of N-methyl-2-pyrrolidone were combined in a stirrer-equipped autoclave. The mixture was purged with nitrogen and slowly heated to 202° C., a total of 19 ml of water distilling off. The mixture was then cooled to approximately 160° C., followed by the addition of 147 g of p-dichlorobenzene (=1 mole) in approximately 50 g of N-methyl-2-pyrrolidone. The reaction mixture is heated to 245° C. in 30 minutes under a nitrogen pressure of 2.5 bars, the pressure rising to 10 bars, and the temperature of 245° C. maintained for 3 hours. After cooling to room temperature, a gray solid is isolated and is subsequently washed with water.

Drying in vacuo at 80° C. gives 100.3 (93%) of poly-p-phenylene sulfide having the following characteristics: melt viscosity $\eta m$ of 4.5 Pa.s ($\tau = 10^2$ Pa). Thermoplastic processing is not possible without preliminary hardening.

COMPARISON EXAMPLE 2

This Examples describes by way of comparison the production of p-polyphenylene sulfide in accordance with U.S. Pat. No. 4,096,132.

130.1 g of sodium sulfide hydrate (corresponding to 1 mole of Na$_2$S), 101.2 g of lithium acetate dihydrate (0.99 mole), 9.2 g of NaOH (0.23 mole) and 400 ml of N-methyl pyrrolidone (2) were combined in a stirrer-equipped autoclave. The mixture was purged with nitrogen and slowly heated to 202° C. The distillate obtained consisted essentially of H$_2$O. 150.3 g of p-dichlorobenzene (1.02 moles) and approximately 70 ml of N-methyl pyrrolidone (2) were added to the remaining reaction mixture. The reaction mixture was then heated to 266° C. and kept at that temperature for 3 hours. Working up gave 87.5 g (81.2%) of light gray poly-p-phenylene sulfide having the following characteristics: $\eta m$ of 15 Pa.s ($\tau = 10^2$ Pa). Thermoplastic processing is not possible without preliminary hardening.

EXAMPLE 1

Production of a branched polyarylene sulfide 191.6 g of sodium sulfide hydrate (1.455 moles), 13.3 g of 45% sodium hydroxide solution, 450 g of N-methyl pyrrolidone and 9.6 g of a 50% aqueous hydrazine solution (0.15 mole ≙ 10 mole percent) are combined under nitrogen in a stirrer-equipped steel autoclave. 44 ml of distillate consisting largely of water are obtained by slow heating to 175° C. 220.5 g of p-dichlorobenzene (1.50 moles) and 2.72 g (0.015 mole) of 1,2,4-trichlorobenzene in 70 ml of N-methyl pyrrolidone are then added, after which the reaction is continued for 5 hours at 240° C./19 bars.

On completion of the reaction, the reaction mixture is left to cool to 150° C., after which the autoclave is vented and the reaction mixture removed. After acidification to pH 5, the p-polyarylene sulfide may readily be isolated by filtration. After washing with water until neutral, followed by filtration, the p-polyarylene sulfide is dried and obtained in the form of a gray-white solid. Melt viscosity $\eta m$ of $2.1 \times 10^3$ Pa.s (as measured at $10^2$ Pa).

EXAMPLE 2

The procedure is as in Example 1, except that 19.2 g of a 50% aqueous hydrazine solution (0.30 moles ≙ 20 mole percent) were used. During removal of the water, 50 ml of distillate were obtained, i.e. correspondingly more water was distilled off. Melt viscosity $\eta m$ of $2.9 \times 10^3$ Pa.s (as measured at $10^2$ Pa).

EXAMPLE 3

As in DE-OS No. 31 20 538, dimethyl acetamide (19.6 g ≙ 15 mole percent, based on 1 mole of sodium sulfide) is added during the reaction. In other respects, the procedure is as in Example 1, a corresponding quantity of sodium hydroxide again being used to neutralize sodium hydrogen sulfide.

Melt viscosity of the p-polyarylene sulfide isolated in the form of a gray-white solid: $\eta m = 1.6 \times 10^5$ (as measured at $10^2$ Pa).

EXAMPLE 4

Production of a branched polyarylene sulfide

The procedure is as in Example 3, except that 1.90 g (0.0105 mole ≙ 0.7 mole percent) of 1,2,4-trichlorobenzene is used as branching agent. Melt viscosity $\eta m = 2.6 \times 10^4$ Pa.s (as measured at $10^2$ Pa).

EXAMPLE 5

Production of a branched polyarylene sulfide

The procedure is as in Example 4, except that 1.90 g (0.0105 mole ≙ 0.7 mole percent) of 1,3,5-trichlorobenzene is used as branching agent. Melt viscosity $\eta m = 5.3 \times 10^4$ Pa.s (as measured at $10^2$ Pa).

EXAMPLE 6

The procedure is as in Example 1, except that the reaction times are different. The reaction was carried out in two temperature stages of 2 hours at 205° C. and 3 hours at 266° C. The p-polyarylene sulfide obtained had a melt viscosity $\eta m$ of $3.3 \times 10^3$ Pa.s (as measured at $10^2$ Pa).

EXAMPLE 7

The p-polyarylene sulfide of Example 4 could be extruded without difficulty in a screw extruder, i.e. was directly thermoplastically processible. By contrast, the p-polyphenylene sulfides of Examples 1 and 2 could not be thermoplastically processed.

At 26.7 kJ/m$^2$, the impact strength ($a_n$) of the p-polyarylene sulfide of Example 4 was adequate for p-polyarylene sulfides (as measured in accordance with DIN 53353).

EXAMPLE 8

Production of a branched polyarylene sulfide 191.6 g of sodium sulfide hydrate (1.455 moles), and 13.3 g of 45% sodium hydroxide (to neutralize sodium hydrogen sulfide present in the sodium sulfide) were combined under nitrogen in 450 g of N-methyl pyrrolidone in a stirrer-equipped steel autoclave. 39 ml of a distillate consisting mainly of water were obtained by slow heating to 175° C.

220.5 g of p-dichlorobenzene (1.50 moles) and 1.63 g (0.009 mole) of 1,2,4-trichlorobenzene in 70 ml of N-methyl pyrrolidone and 5.67 g (0.15 mole ≙ 10 mole percent) of sodium borohydride are then added. After the autoclave has been closed, the reaction is carried out for 5 hours at 240° C./16 bars.

On completion of the reaction, the reaction mixture is left to cool to 150° C., after which the autoclave is vented and the reaction mixture removed. The reaction mixture is slightly acidified and the p-polyarylene sulfide is isolated by filtration.

After washing with water until neutral, followed by drying, the p-polyarylene sulfide is obtained in the form of a gray-white solid having a melt viscosity $\eta m$ (as measured at $\tau = 10^2$ Pa) of $1.2 \times 10^3$ Pa.s.

EXAMPLE 9

The procedure is the same as in Example 8, except that 20 mole percent of sodium borohydride are used. Melt viscosity $\eta m$ of $2.15 \times 10^3$ Pa.s (as measured at $10^2$ Pa).

EXAMPLE 10

The procedure was as in Example 8, except that 59 ml of distillate consisting largely of water were obtained. A solution of 2.84 g (0.075 mole ≙ 5 mole percent) of sodium borohydride in 27.7 g of a 0.2% sodium hydroxide solution was added in 5 portions during the reaction which lasted 5 hours.

The p-polyarylene sulfide isolated had a melt viscosity $\eta m$ of $1.85 \times 10^3$ Pa.s (as measured at $10^2$ Pa).

EXAMPLE 11

As in DE-OS No. 31 20 538, dimethyl acetamide (19.6 g ≙15 mole percent, based on 1 mole of sodium sulfide) is used during the reaction. In other respects, the procedure is as in Example 8, a corresponding quantity of sodium hydroxide again being used to neutralize any sodium hydrogen sulfide present in the reaction mixture. Melt viscosity $\eta m$ of the p-polyarylene sulfide isolated: $7.9 \times 10^3$ Pa.s (as measured at $10^2$ Pa).

EXAMPLE 12

Production of a branched polyarylene sulfide

The procedure is as in Example 11, except that 3.26 g (0.018 mole) of 1,2,4-trichlorobenzene is used for branching. Melt viscosity $\eta m$ of the p-polyarylene sulfide obtained: $3.4 \times 10^4$ Pa.s (as measured at $10^2$ Pa).

EXAMPLE 13

The procedure was as in Example 12, except that the reaction was carried out under different conditions, i.e. in two temperature stages of 2 hours at 205° C. and 3 hours at 266° C. The p-polyaryl sulfide obtained had a melt viscosity $\eta m$ of $7.9 \times 10^4$ Pa.s (as measured at $10^2$ Pa).

EXAMPLE 14

The p-polyarylene sulfide of Example 12 could be directly thermoplastically processed without difficulty in a screw extruder. By contrast, the p-polyarylene sulfides of Examples 1 and 2 could not be thermoplastically processed.

The p-polyarylene sulfide of Example 12 shows an excellent impact strength $a_n$ for p-polyarylene sulfides of 23.5 kJ/m² (as measured in accordance with DIN 53 453).

EXAMPLE 15

Production of a branched polyarylene sulfide 191.6 g of sodium sulfide hydrate (1.455 moles), 35.3 g of 45% sodium hydroxide solution (to bind decomposition products of the sodium formate released during the reaction and to neutralize any sodium hydrogen sulfide present in the sodium sulfide) and 20.4 g of sodium formate (0.3 mole ≙ 20 mole percent) are combined in a stirrer-equipped steel autoclave. 48 ml of distillate consisting largely of water are obtained by slow heating to 175° C.

220.5 g of p-dichlorobenzene (1.50 moles) and 1.63 g (0.009 mole) of 1,2,4-trichlorobenzene in 70 ml of N-methyl pyrrolidone are then added. After the autoclave has been closed, the reaction is carried out for 5 hours at 240° C./17 bars.

After the reaction, the reaction mixture is left to cool to 150° C., after which the autoclave is vented and the reaction mixture removed. The reaction mixture is slightly acidified with dilute hydrochloric or sulfuric acid. The polyarylene sulfide is filtered, washed with water until a neutral reaction is obtained and dried.

The polyarylene sulfide is isolated in the form of a gray-white solid and has a melt viscosity $\eta m$ of $9.7 \times 10^2$ Pa.s (as measured at $10^2$ Pa).

EXAMPLE 16

The procedure is as in Example 15, except that the sodium formate (0.15 mole ≙20 mole percent) is added after the removal of water. Melt viscosity $\eta m = 1.1 \times 10^3$ Pa.s (as measured at $10^2$ Pa).

EXAMPLE 17

Production of a branched polyarylene sulfide

The procedure is as in Example 15, except that 3.26 g (0.018 mole ≙1.2 mole percent) of 1,2,4-trichlorobenzene are used. Melt viscosity $\eta m = 4.3 \times 10^3$ Pa.s (as measured at $10^2$ Pa).

EXAMPLE 18

As in DE-OS No. 31 20 538, dimethyl acetamide (19.6 g ≙15 mole percent, based on 1 mole of sodium sulfide) is used during the reaction. In other respects, the procedure is as in Example 15, a corresponding quantity of sodium hydroxide again being used to neutralize sodium hydrogen sulfide. Melt viscosity $\eta m$ of the polyarylene sulfide isolated: $6.9 \times 10^3$ Pa.s (as measured at $10^2$ Pa).

EXAMPLE 19

The procedure is as in Example 18, except that 10.2 g of sodium formate (corresponding to 10 mole percent, based on sodium sulfide) are used. Melt viscosity $\eta m = 4.2 \times 10^3$ Pa.s (as measured at $10^2$ Pa).

EXAMPLE 20

Production of a branched polyarylene sulfide

The procedure is as in Example 19, except that the degree of branching is higher: 0.015 mole of 1,2,4-trichlorobenzene, corresponding to 2 72 g (1.0 mole percent, based on sodium sulfide). Melt viscosity $\eta m = 2.3 \times 10^4$ Pa.s (as measured at $10^2$ Pa).

EXAMPLE 21

The procedure is as in Example 18, except that the reaction is carried out under different conditions, namely: 2 hours at 205° C. and 3 hours to 267° C. Melt viscosity $\eta m = 8.8 \times 10^3$ Pa.s as measured at $10^2$ Pa).

EXAMPLE 22

The polyarylene sulfide of Example 18 could be directly thermoplastically processed without difficulty in a screw extruder. By contrast, the p-polyphenylene sulfides of Examples 1 and 2 could not be thermoplastically processed.

The polyarylene sulfide of Example 18 shows an excellent impact strength $a_n$ for polyarylene sulfides of 22.3 kJ/m² (as measured in accordance with DIN 54 453).

We claim:

1. A process for the production of an optionally branched, high molecular weight polyarylene sulfide having a high melt viscosity, comprising reacting in the presence of a reducing agent selected from hydrazine, alkali metal borohydrides, alkali metal formates; a mixture of (a) from 100 to 0 mole percent

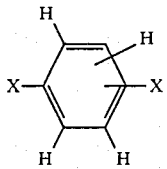 (I)

and from 0 to 100 mole percent

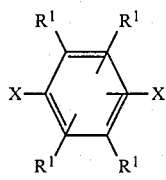 (II)

where the sum of (I) and (II) is 100 mole percent, and where each X is independently chlorine or bromine in the meta or para position to one another and where each $R^1$ is independently hydrogen, an alkyl containing from one to twenty carbon atoms, a cycloalkyl containing from five to twenty carbon atoms, an aryl containing from six to twenty-four carbon atoms, an alkaryl containing from seven to twenty-four carbon atoms, or an aralkyl containing from seven to twenty-four carbon atoms, where two of $R^1$ in the ortho position to one another may be attached to form an aromatic or 6-membered heterocyclic ring containing up to 3 heteratoms, and where one of $R^1$ is always different from hydrogen; and (b) from 0 to 3.0 percent, based on the sum of (I) and (II), of an aromatic trihalogen or tetrahalogen compound $$ArX_n$$

where Ar is an aromatic or heterocyclic moiety having from six to twenty-four carbon atoms and up to 3 heteroatoms, X is chlorine or bromine, and where n is 3 or 4;

(c) an alkali metal sulfide, in a molar ratio (a+b):c of from 0.85:1 to 1.15:1; and (d) at least one polar solvent, in a molar ratio of c:d of from 1:2 to 1:15.

2. A process as claimed in claim 1, wherein the reducing agent is a hydrazine.

3. A process as claimed in claim 1, wherein the reducing agent is an alkali metal borohydride.

4. A process as claimed in claim 1, wherein the reducing agent is an alkali metal formate.

5. A process as claimed in claim 1, wherein the heteroatoms are selected from O, N or S.

6. A process as claimed in claim 1, further comprising adding an alkali metal hydroxide to the mixture.

7. A process as claimed in claim 1, wherein the molar ratio (a+b):c, is from 0.95:1 to 1.15:1.

8. A process as claimed in claim 1, further comprising reacting in the presence of at least one catalyst.

9. A process as claimed in claim 1, further comprising reacting in the presence of a cosolvent.

* * * * *